US008843137B2

(12) United States Patent
Yoshihara

(10) Patent No.: US 8,843,137 B2
(45) Date of Patent: Sep. 23, 2014

(54) FEMTOCELL RADIO BASE STATION, COMMUNICATION CONTROL METHOD, AND RECORDING MEDIUM

(75) Inventor: Yusaku Yoshihara, Tokyo (JP)

(73) Assignee: NEC Corporation, Tokyo (JP)

( * ) Notice: Subject to any disclaimer, the term of this patent is extended or adjusted under 35 U.S.C. 154(b) by 123 days.

(21) Appl. No.: 13/567,623

(22) Filed: Aug. 6, 2012

(65) Prior Publication Data
US 2013/0005345 A1 Jan. 3, 2013

(30) Foreign Application Priority Data

Jun. 14, 2011 (JP) ................................. 2011-132050

(51) Int. Cl.
| | | |
|---|---|---|
| *H04W 36/04* | (2009.01) | |
| *H04W 36/22* | (2009.01) | |
| *H04W 52/02* | (2009.01) | |
| H04W 36/36 | (2009.01) | |
| H04W 84/04 | (2009.01) | |
| H04W 88/08 | (2009.01) | |

(52) U.S. Cl.
CPC .......... *H04W 52/0206* (2013.01); *H04W 36/22* (2013.01); *Y02B 60/50* (2013.01); *H04W 36/365* (2013.01); *H04W 84/045* (2013.01); *H04W 88/08* (2013.01)
USPC ......................................... 455/443; 455/572

(58) Field of Classification Search
USPC .......... 455/418–419, 423–424, 443, 571–574
See application file for complete search history.

(56) References Cited

U.S. PATENT DOCUMENTS

| | | | |
|---|---|---|---|
| 2007/0281754 A1* | 12/2007 | Dwelley et al. ............... | 455/572 |
| 2008/0055104 A1 | 3/2008 | Masui et al. | |
| 2008/0122292 A1 | 5/2008 | Minami | |
| 2008/0140813 A1* | 6/2008 | Ratcliff et al. ............... | 709/220 |
| 2008/0244148 A1 | 10/2008 | Nix, Jr. et al. | |
| 2009/0093246 A1 | 4/2009 | Czaja et al. | |
| 2010/0291884 A1* | 11/2010 | Hu et al. ....................... | 455/101 |
| 2011/0125341 A1* | 5/2011 | Heath et al. .................. | 700/295 |

FOREIGN PATENT DOCUMENTS

| | | | |
|---|---|---|---|
| JP | 2003280771 A | 10/2003 | |
| JP | 2010259168 A | 11/2010 | |

OTHER PUBLICATIONS

European search report for EP12170939.8 dated Sep. 26, 2012.

\* cited by examiner

*Primary Examiner* — Kashif Siddiqui
(74) *Attorney, Agent, or Firm* — Sughrue Mion, PLLC

(57) ABSTRACT

A femtocell radio base station, which radio-communicates with one or more communication terminal units, includes a plurality of terminals that receive power from a power supply unit when connected to the power supply unit respectively; a measurement unit that measures total power supplied from one or more connection terminals connected to the power supply unit from among the plurality of terminals; and a control unit that controls radio communication with the one or more communication terminal units based on a measurement result of the measurement unit.

7 Claims, 4 Drawing Sheets

FEMTOCELL RADIO BASE STATION, COMMUNICATION CONTROL METHOD, AND RECORDING MEDIUM

BACKGROUND OF THE INVENTION

1. Field of the Invention

The present invention relates to a femtocell radio base station, a communication control method, and a recording medium, for example, to a femtocell radio base station that receives power through a USB (Universal Serial Bus) cable, a communication control method thereof, and a recording medium.

2. Description of the Related Art

Patent Literature 1 (JP2003-280771A, Publication) describes an electronic device that operates with power that is supplied from another electronic device through a USB cable. In addition, a so-called femtocell radio base station, which operates with power supplied from another electronic device through a USB cable (hereinafter this radio base station is referred to as "femtocell radio base station using USB power supply scheme"), is known.

The femtocell radio base station using USB power supply scheme provides a fixed communication service (for example, the number of communicable communication terminal units, radio transmission power, or communication speed).

Application situations in which a femtocell radio base station is used are not always fixed. For example, it can be expected that there is one situation in which one user occupies a communication service of a femtocell radio base station with his or her communication terminal unit and another situation in which a plurality of users shares the communication service of a femtocell radio base station with their communication terminal units.

However, since a femtocell radio base station using USB power supply scheme is provided with a specific communication service, it is impossible to change the communication service. Thus, there was a problem in which users needed to make proper use of a plurality of femtocell radio base stations, which differ in communication services, corresponding to their application situations.

SUMMARY OF THE INVENTION

An exemplary object of the present invention is to provide a femtocell radio base station, a communication control method, and a recording medium that can solve the foregoing problem.

A femtocell radio base station, which radio-communicates with one or more communication terminal units, according to an exemplary aspect of the invention includes:

a plurality of terminals that receive power from a power supply unit when connected to the power supply unit respectively;

a measurement unit that measures total power received by one or more connection terminals connected to the power supply unit from among the plurality of terminals; and a control unit that controls radio communication with the one or more communication terminal units based on a measurement result of the measurement unit.

A communication control method, according to an exemplary aspect of the invention, in which a femtocell radio base station having a plurality of terminals that receive power from a power supply unit when connected to the power supply unit respectively, includes:

measuring total power received by one or more connection terminals connected to the power supply unit from among the plurality of terminals; and controlling radio communication with one or more communication terminal units based on the measurement result.

A computer readable recording medium, according to an exemplary aspect of the invention, that records a program that causes a computer connected to a plurality of terminals that receive power from a power supply unit when connected to the power supply unit respectively to perform procedures includes:

measuring total power received by one or more connection terminals connected to the power supply unit from among the plurality of terminals; and controlling radio communication with one or more communication terminal units based on the measurement result.

The above and other objects, features, and advantages of the present invention will become apparent from the following description with reference to the accompanying drawings which illustrate an example of the present invention.

BRIEF DESCRIPTION OF THE DRAWINGS

FIG. 2 is a schematic diagram showing an example of service information 15a1 stored in service storage section 15a.

DETAILED DESCRIPTION OF EXEMPLARY EMBODIMENT

In the following, with reference to the accompanying drawings, a femtocell radio base station according to an exemplary embodiment of the present invention will be described.

Figure 1:
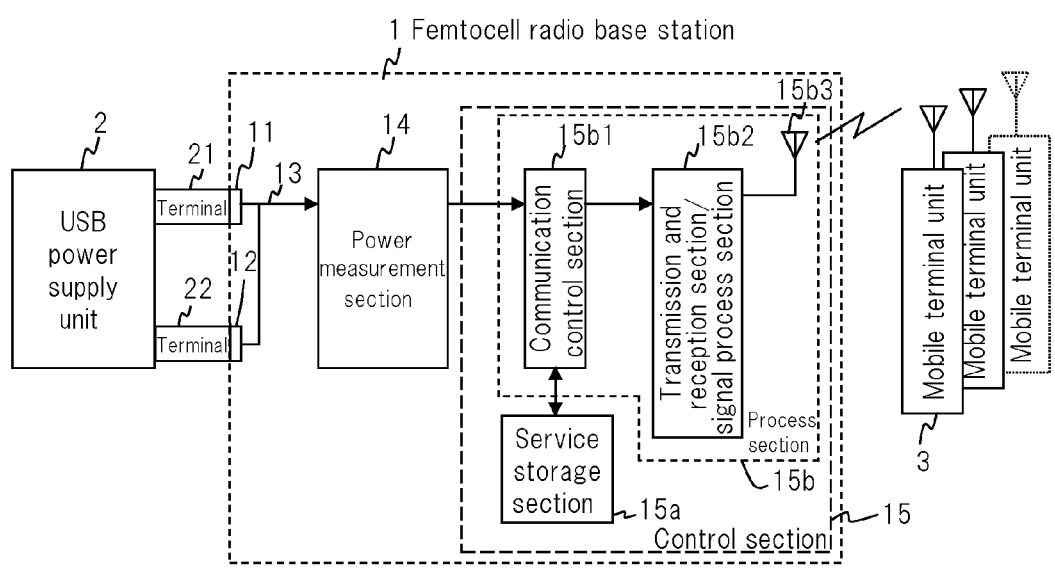
FIG. 1 is a block diagram describing femtocell radio base station 1 according to an exemplary embodiment of the present invention.

FIG. 1 is a block diagram describing femtocell radio base station 1 according to an exemplary embodiment of the present invention In FIG. 1, femtocell radio base station 1 receives power from USB power supply unit 2 and radio-communicates with one or a plurality of mobile terminal units 3. USB power supply unit 2 is an example of a power supply unit and is provided with USB terminals 21 and 22. Mobile terminal unit 3 is an example of a communication terminal unit.

Femtocell radio base station 1 includes USB cable 13 provided with USB terminals 11 and 12; supplied power measurement section 14; and control section 15. Control section 15 includes service storage section 15a and process section 15b. Process section 15b includes communication control section 15b1, transmission and reception section/signal process section (hereinafter referred to as "communication section") 15b2, and antenna 15b3.

USB terminals 11 and 12 can be generally referred to as plurality of terminals.

When USB terminals 11 and 12 are connected to USB terminal 21 or 22 of USB power supply unit 2, respectively, USB terminals 11 and 12 receive power from USB power supply unit 2.

USB cable 13 supplies the total sum of power received by one or two USB terminals connected to USB power supply unit 2 (hereinafter this USB terminal is referred to as "connected terminal)" from among USB terminals 11 and 12 to supplied power measurement section 14.

Supplied power measurement section 14 can be generally referred to as measurement means.

Supplied power measurement section 14 measures total power supplied from USB cable 13, namely total power received by connected terminals.

In addition, supplied power measurement section 14 has a function that notifies control section 15 (specifically, communication control section 15b1) of a measured power value (measurement result).

When the user connects USB cable 13 to one of USB terminals 21 and 22 (for example, terminal 21), supplied power measurement section 14 notifies control section 15 of maximum value A of the supplied power amount of one USB terminal as a measured power value.

On the other hand, when the user connects USB cable 13 to both USB terminals 21 and 22, supplied power measurement section 14 notifies control section 15 of total value B of the maximum values of the supplied power amounts of two USB terminals as a measured power value.

In addition, supplied power measurement section 14 supplies the power supplied from USB cable 13 to each section of femtocell radio base station 1 so as to operate each section.

Control section 15 can be generally referred to as control means.

Control section 15 controls radio communication with mobile terminal unit 3 based on the measured power value received from supplied power measurement section 14.

Service storage section 15a can be generally referred to as storage means.

Service storage section 15a stores service information. Service information represents a communication service as regards radio communication for which femtocell radio base station 1 communicates with mobile terminal unit 3.

Service information represents the upper limit value of the number of communicable mobile terminal units corresponding to the supplied power amount. Service information also represents radio transmission power corresponding to the supplied power amount. Service information also represents communication speed corresponding to the supplied power amount. Service information also represents communication disconnection method that serves to decrease the number of communicating mobile terminal units 3.

Figure 2:
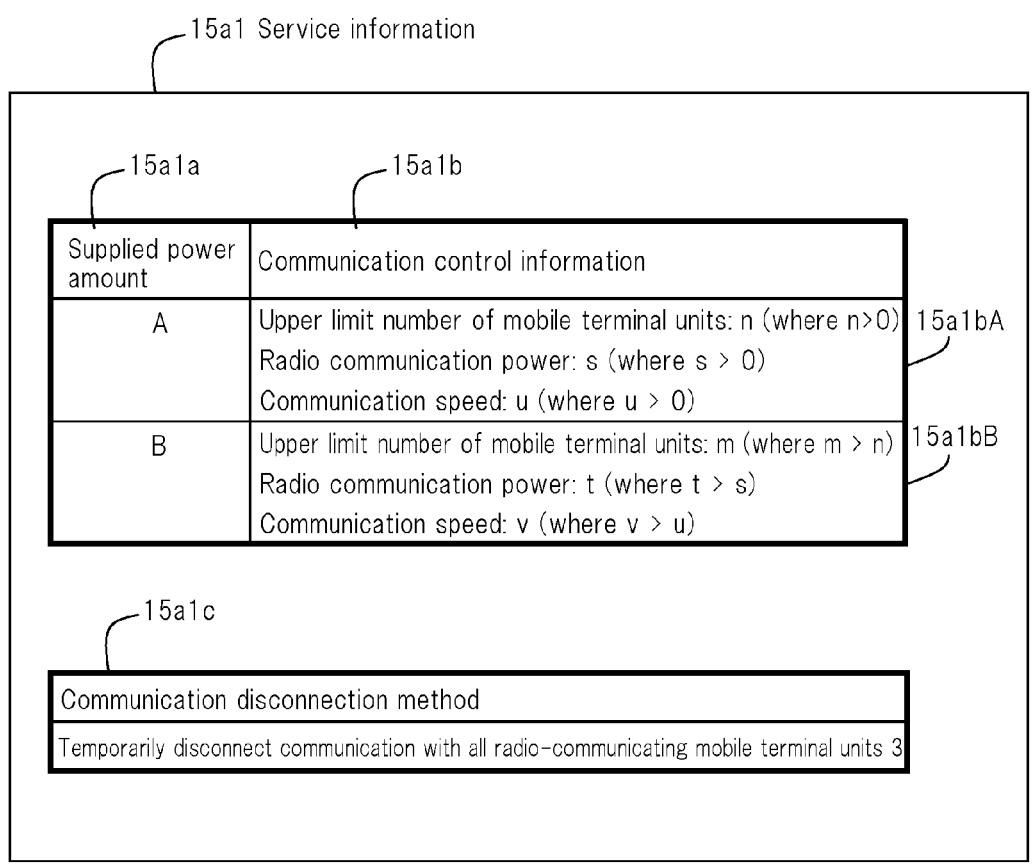

FIG. 2 is a schematic diagram showing an example of service information 15a1 stored in service storage section 15a.

Service information 15a1 represents supplied power amount 15a1a, communication control information 15a1b associated with supplied power amount 15a1a, and communication disconnection method 15a1c.

Supplied power amount 15a1a represents maximum value A of the amount of supplied power of one USB terminal and total value B of the maximum values of supplied power amounts of two USB terminals.

Communication control information 15a1b is information with respect to a communication service that femtocell radio base station 1 provides.

Among communication control information 15a1b, communication control information 15a1bA associated with maximum value A represents upper limit value n (where n>0) of mobile terminal units 3, radio communication power s (where s>0), and communication speed u (where u>0).

Among communication control information 15a1b, communication control information 15a1bB associated with total value B represents upper limit value m (where m>n) of mobile terminal units 3, radio communication power t (where t≥s), and communication speed v (where u≥v).

In communication control information 15a1b shown in FIG. 2, the upper limit number of mobile terminal units, radio communication power, and communication speed are changed corresponding to the amount of supplied power. Alternatively, at least one from among the upper limit number of mobile terminal units, radio communication power, and communication speed may be changed corresponding to the amount of supplied power.

Communication disconnection method 15a1c is a communication disconnection method that serves to decrease the number of radio-communicating mobile terminal units 3.

The communication disconnection method has for example three options: a first method that serves to temporarily disconnect all communication with all radio-communicating mobile terminal units 3; a second method that serves to disconnect communication with mobile terminal units 3 other than a particular mobile terminal unit of radio-communicating mobile terminal units 3; and a third method that serves to disconnect communication with a communication terminal unit selected from radio-communicating mobile terminal units 3 by process section 15b according to a predetermined autonomous determination technique.

The user can select one of these options so as to store the selected option to service storage section 15a.

FIG. 2 shows that the first method has been used as communication disconnection method 15a1c.

As the autonomous determination method that is the third method, a determination method, which serves to select mobile terminal unit 3 that is the farthest apart from femtocell radio base station 1 from among radio-communicating mobile terminal units 3 as a communication terminal unit to be disconnected, is used. Process section 15b increases transmission power for which femtocell radio base station 1 communicates with mobile terminal unit 3 corresponding to the distance from femtocell radio base station 1 to mobile terminal unit 3. Thus, when this determination method is used, process section 15b selects mobile terminal unit 3 whose transmission power is highest as the communication terminal unit to be disconnected. Thus, when this determination method is used, process section 15b selects mobile terminal unit 3 whose communication transmission power is the highest as the communication terminal unit to be disconnected.

Process section 15b can be generally referred to as process means.

Process section 15b stores the measured power value received from supplied power measurement section 14. Referring to service storage section 15a, process section 15b identifies communication control information 15a1b (number of communicable mobile terminal units, radio transmission power, and communication speed) corresponding to the currently measured power value received from supplied power measurement section 14 and executes a communication service corresponding to identified communication control information 15a1b.

When the currently measured power value received from supplied power measurement section 14 is lower than the previously measured power value received from supplied power measurement section 14, process section 15b decreases the number of radio-communicating mobile terminal units 3 according to communication disconnection method 15a1c.

According to this exemplary embodiment, when the currently measured power value received from supplied power measurement section 14 is lower than the previously measured power value received therefrom and the number of radio-communicating mobile terminal units 3 is larger than the upper limit number of mobile terminal units 3 corresponding to the currently measured power value, process section 15b decreases the number of radio-communicating mobile terminal units 3 to the upper limit number of mobile terminal units 3 corresponding to the currently measured power value according to communication disconnection method 15a1c stored in service storage section 15a.

Whenever communication control section 15b1 receives a measured power value from supplied power measurement section 14, communication control section 15b1 stores the measured power value and deletes a measured power value preceded by the previously measured power value. When supplied power measurement section 14 stops supplying power to communication control section 15b1, it deletes all measured power values that it has stored.

Communication control section 15b1 inquires service information of service storage section 15a based on the measured power value received from supplied power measurement section 14. When communication control section 15b1 receives communication control information 15a1b corresponding to the measured power value or communication control information 15a1b and communication disconnection method 15a1c corresponding to the measured power value from service storage section 15a as reply information, communication control section 15b1 generates a control signal that represents the reply information and outputs the control signal to communication section 15b2.

Communication section 15b2 radio-communicates with one or a plurality of mobile terminal units 3 through antenna 15b3 based on the control signal received from communication control section 15b1.

Next, the operation of femtocell radio base station 1 will be described.

Figure 3:
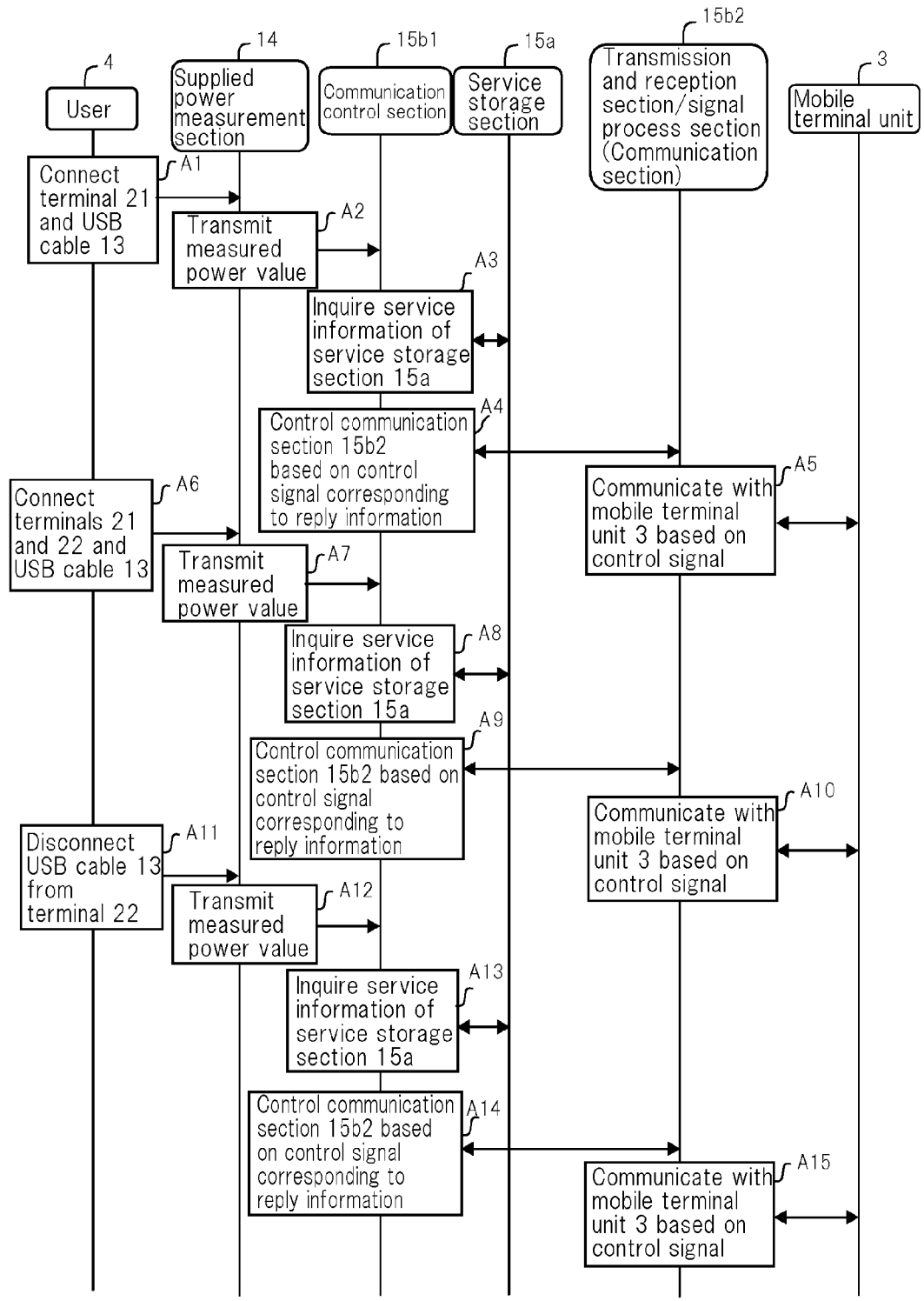
FIG. 3 is a sequence chart describing an operation of femtocell radio base station 1.

FIG. 3 is a sequence chart describing the operation of femtocell radio base station 1.

When USB power supply unit 2 is not connected to femtocell radio base station 1 (in this situation, a previously measured power value has not been stored in communication control section 15b1), user 4 connects USB terminal 21 and femtocell radio base station 1 with USB cable 13 (at step A1).

When one USB terminal (USB terminal 11 or 12) of USB cable 13 is connected to USB terminal 21 of USB power supply unit 2, supplied power measurement section 14 measures power received from USB terminal 21 of USB power supply unit 2 through USB cable 13 and notifies communication control section 15b1 of the measured power (at step A2). In this case, supplied power measurement section 14 notifies communication control section 15b1 of maximum value A as the measured power value.

When communication control section 15b1 has not stored a previously measured power value, and receives a measured power value (maximum value A), communication control section 15b1 stores the measured power value (currently measured power value) and requests service information from service storage section 15a based on the currently measured power value (at step A3).

According to this exemplary embodiment, communication control section 15b1 outputs maximum value A that is the currently measured power value as an inquiry about service information to service storage section 15a. When service storage section 15a receives measured power value (maximum value A), service storage section 15a outputs communication control information 15a1bA (refer to FIG. 20) associated with the measured power value (maximum value A) as reply information to communication control section 15b1.

When communication control section 15b1 receives replay information (communication control information 15a1bA), communication control section 15b1 generates a control signal that represents communication control information 15a1bA and controls communication section 15b2 based on the control signal (at step A4).

Communication section 15b2 executes a communication service for which the upper limit value of mobile terminal units 3 is n, the radio communication power is s, and the communication speed is u through antenna 15b3 based on the control signal received from communication control section 15b1 and radio-communicates with the maximum of n mobile terminal units 3 based on the communication service (at step A5).

Thereafter, user 4 additionally connects USB terminal 22 of USB power supply unit 2 and femtocell radio base station 1 with USB cable 13 corresponding to a utilization situation in which user 4 uses femtocell radio base station 1 (at step A6).

When USB terminals 11 and 12 of USB cable 13 are connected to USB terminals 21 and 22 of USB power supply unit 2, respectively, supplied power measurement section 14 measures power received from USB terminals 21 and 22 of USB power supply unit 2 through USB cable 13 and notifies communication control section 15b1 of the measured power value (in this case, total value B) (at step A7).

When communication control section 15b1 receives the measured power value (total value B), communication control section 15b1 stores the currently measured power value (total value B) and requests service information from service storage section 15a based on the currently measured power value (total value B) (at step A8).

According to this exemplary embodiment, communication control section 15b1 outputs total value B that is the currently measured power value as the inquiry about service information to service storage section 15a. When service storage section 15a receives the measured power value (total value B), service storage section 15a outputs communication control information 15a1bB (refer to FIG. 2) associated with the measured power value (total value B) as reply information to communication control section 15b1.

When communication control section 15b1 receives the replay information (communication control information 15a1bB), communication control section 15b1 generates a control signal that represents communication control information 15a1bB and controls communication section 15b2 based on the control signal (at step A9).

Communication section 15b2 executes a communication service in which the upper limit number of mobile terminal units 3 is m, the radio communication power is t, and the communication speed is v through antenna 15b3 based on the control signal received from communication control section 15b1 and radio-communicates with a maximum of m mobile terminal units 3 based on the communication service (at step A10).

Thereafter, user 4 disconnects one USB terminal (USB terminal 11 or 12) of USB cable 13 from USB terminal 22 of USB power supply unit 2 corresponding to a utilization situation of femtocell radio base station 1 (at step A11).

When one USB terminal of USB cable 13 is disconnected from USB terminal 22 of USB power supply unit 2, supplied power measurement section 14 measures power received from USB terminal 21 of USB power supply unit 2 through USB cable 13 and notifies communication control section 15b1 of the measured power value (at step A12). In this case, supplied power measurement section 14 notifies communication control section 15b1 of maximum value A as the measured power value.

When communication control section 15b1 has stored a previously measured power value (total value B) and a further previously measured power value, and receives a currently measured power value (maximum value A), communication control section 15b1 stores the currently measured power value and deletes the further previously measured power value. In addition, since the currently measured power value (maximum value A) is lower than the previously measured power value (total value B), communication control section 15b1 generates a read request for communication disconnection method 15a1c and requests service information from service storage section 15a based on the read request and the currently measured power value (maximum value A) (at step A13).

According to this exemplary embodiment, communication control section 15b1 outputs maximum value A that is the currently measured power value and the read request as an inquiry about service information to service storage section 15a. When service storage section 15a receives the measured power value (maximum value A) and the read request, service storage section 15a outputs communication control information 15a1bA (refer to FIG. 2) and communication disconnection method 15a1c associated with the measured power value (maximum value A) as replay information to communication control section 15b1.

When communication control section 15b1 receives the replay information (communication control information 15a1bA and communication disconnection method 15a1c), communication control section 15b1 generates a control signal that represents communication control information 15a1bA and communication disconnection method 15a1c and controls communication section 15b2 based on the control signal (at step A14).

Communication section 15b2 executes a communication service in which the upper limit number of mobile terminal units 3 is n, the radio communication power is s, and the communication speed is u through antenna 15b3 based on the control signal received from communication control section 15b1 and radio-communicates with a maximum of n mobile terminal units 3 based on the communication service (at step A15). At this point, when the number of radio-communicating mobile terminal units 3 is larger than the upper limit number n of mobile terminal units 3 corresponding to the currently measured power value, communication section 15b2 decreases the number of radio-communicating mobile terminal units 3 to the upper limit number n of mobile terminal units 3 corresponding to the currently measured power value according to communication disconnection method 15a1c represented by the control signal.

According to this exemplary embodiment, supplied power measurement section 14 measures total power received by a terminal connected to USB power supply unit 2 of USB terminals 11 and 12 of USB cable 13. Control section 15 controls radio communication with mobile terminal units 3 based on the measurement result of supplied power measurement section 14.

Figure 4:
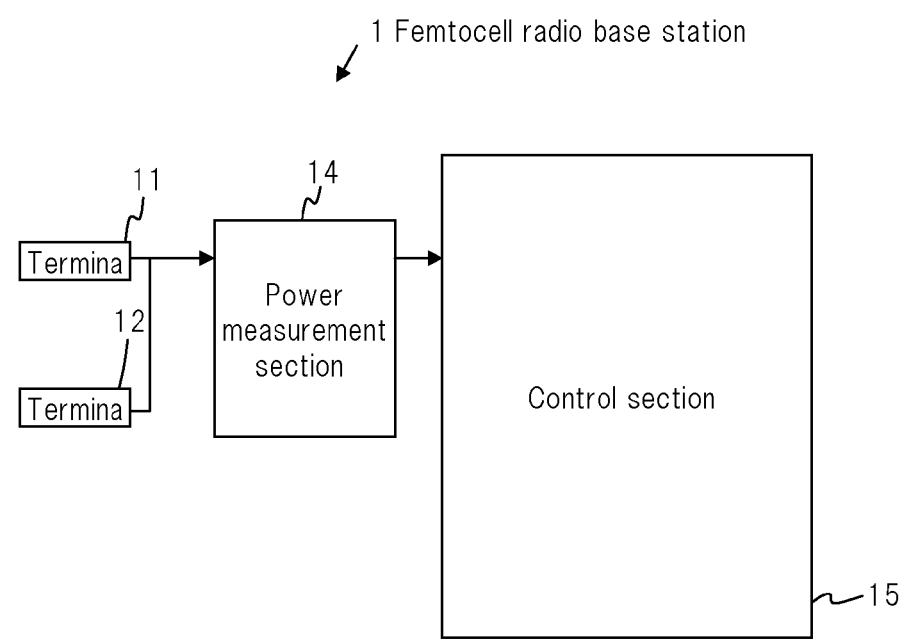
FIG. 4 is a block diagram showing a femtocell radio base station composed of USB terminals 11 and 12, supplied power measurement section 14, and control section 15.

Thus, femtocell radio base station 1 that receives power from USB power supply unit 2 can change radio communication with mobile terminal units 3 based on the amount of power received from USB power supply unit 2. Thus, femtocell radio base station 1 can change a communication service for mobile terminal unit 3 corresponding to the amount of power received from USB power supply unit 2. As a result, single femtocell radio base station 1 can provide a service based on a utilization situation by the user. This effect can be applied to a femtocell radio base station composed of USB terminals 11 and 12, supplied power measurement section 14, and control section 15. FIG. 4 is a block diagram showing a femtocell radio base station composed of USB terminals 11 and 12, supplied power measurement section 14, and control section 15.

According to this exemplary embodiment, control section 15 controls at least one from among the upper limit number of radio-communicable mobile terminal units 3, radio communication power, and communication service based on the measurement result of supplied power measurement section 14. In this case, while maintaining the communication quality, control section 15 can dynamically change the number of communicable mobile terminal units, radio transmission power, or communication speed.

In addition, according to this exemplary embodiment, service storage section 15a stores communication disconnection method 15a1c that serves to decrease the number of radio-communicating mobile terminal units 3. When the measurement result of supplied power measurement section 14 represents power lower than the previously measurement result, process section 15b decreases the number of radio-communicating mobile terminal units 3 according to communication disconnection method 15a1c stored in service storage section 15a. In this case, when the number of radio-communicating mobile terminal units 3 needs to be decreased, they can be decreased according to a preset manner.

In addition, according to this exemplary embodiment, service storage section 15a stores as a communication disconnection method any from among a first method that serves to temporarily disconnect all communication with all radio-communicating mobile terminal units 3; a second method that serves to disconnect communication with mobile terminal units 3 other than a particular mobile terminal unit of radio-communicating mobile terminal unit 3; and a third method that serves to disconnect communication with a communication terminal unit selected from radio-communicating mobile terminal units 3 by process section 15b according to a predetermined autonomous determination technique. In this case, the communication disconnection method can be selected from a plurality of options.

Next, effects of the present invention will be described.

As a first effect, a service corresponding to a user's application situation can be provided. Thus, a single femtocell radio base station can be used in a situation where a single user occupies the service of the femtocell radio base station with his or her mobile terminal unit and in a situation where a plurality of users share a service of the femtocell radio base station with their mobile terminal units. This is because the upper limit of a service is dynamically changed based on the amount of supplied power.

As a second effect, the users do not need to perform a special operation. Thus, a wide range of users can use a femtocell radio base station corresponding to their individual situations. This is because the upper limit of a service can be easily changed, for example, by disconnecting a USB cable.

As a third effect, unnecessary power can be prevented from being wasted. Thus, when a USB power supply unit is a portable computer device having a built-in battery, the battery power consumption can be reduced and thereby energy can be saved. This is because a service that is provided by a femtocell radio base station can be used with power supplied from one USB terminal.

As a fourth effect, even if the number of terminals of the USB power supply unit is limited, a minimum service that is provided by the femtocell radio base station can be used.

Thus, even if the USB power supply unit provides only one USB terminal, the user can use the service that is provided the femtocell radio base station. This is because the service that is provided by the femtocell radio base station can be used with power supplied from one USB terminal.

Femtocell radio base station 1 may be realized by a computer to which USB cable 13 is connected. In this case, the computer reads a program from a record medium such as a computer readable CD-ROM (Compact Disk Read Only Memory) and executes the program so as to function as supplied power measurement section 14, service storage section 15a, and process section 15b. The record medium is not limited to a CD-ROM, but can be appropriately changed.

An exemplary effect of the present invention is in that one femtocell radio base station can provide a communication service corresponding to a plurality of utilization situations.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A femtocell radio base station that radio-communicates with one or more communication terminal units, comprising:
   a plurality of terminals that receive power from a power supply unit when connected to said power supply unit respectively;
   a measurement unit that measures total power received by one or more connection terminals connected to said power supply unit from among said plurality of terminals; and
   a control unit that controls radio communication with said one or more communication terminal units based on a measurement result of said measurement unit.

2. The femtocell radio base station according to claim 1, wherein said control unit controls, based on a measurement result of said measurement unit, at least one from among an upper limit number of said communication terminal units that are in radio communication with said femtocell radio base station, radio communication power, and communication speed.

3. The femtocell radio base station according to claim 1, wherein said control unit includes:
   a storage unit that stores a communication disconnection method that serves to decrease the number of said communication terminal units that are in radio communication with said femtocell radio base station; and
   a process unit that decreases the number of said communication terminals, which are in radio communication with said femtocell radio base station, according to a communication disconnection method stored in said storage unit when the measurement result of said measurement unit represents power lower than a previous measurement result of said measurement unit.

4. The femtocell radio base station according to claim 3, wherein said storage unit stores as said communication disconnection method any one from among a first method that serves to disconnect all communication with all communication terminal units that are in radio communication with said femtocell radio base station; a second method that serves to disconnect communication with other than a particular communication terminal unit from among said communication terminal units that are in radio communication with said femtocell radio base station; and a third method that serves to disconnect communication with a communication terminal unit selected from said communication terminal units which are in radio communication with said femtocell radio base station according to a predetermined determination technique.

5. The femtocell radio base station according to claim 1, wherein said terminal is a USB terminal.

6. A communication control method for a femtocell radio base station having a plurality of terminals that receive power from a power supply unit when connected to said power supply unit respectively, comprising:
   measuring total power received by one or more connection terminals connected to said power supply unit from among said plurality of terminals; and
   controlling radio communication with one or more communication terminal units based on the measurement result.

7. A non-transitory computer usable medium that records a program that causes a computer connected to a plurality of terminals that receive power from a power supply unit when connected to said power supply unit respectively to perform procedures comprising:
   measuring total power received by one or more connection terminals connected to said power supply unit from among said plurality of terminals; and
   controlling radio communication with one or more communication terminal units based on the measurement result.

* * * * *